Patented Apr. 3, 1951

2,547,712

UNITED STATES PATENT OFFICE 2,547,712

FURANE COMPOUNDS

Loren M. Long, Grosse Pointe Woods, and Nickolas D. Jenesel, Detroit, Mich., assignors to Parke, Davis & Company, Detroit, Mich., a corporation of Michigan No Drawing. Application March 26, 1949, Serial No. 83,769

8 Claims. (Cl. 260—345)

This application relates to new chemical compounds and to chemical methods useful for their synthesis. More particularly, the invention relates to certain chemical compounds possessing antibiotic activity, intermediates useful in their preparation and derivatives thereof.

The end products of the present invention and their derivatives are 1-[2-furyl]-2-aminopropane-1,3-diol compounds having the general formula,

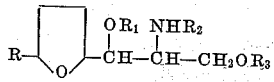

while the intermediates used in their preparation are 2-furyl-α-acylamido-β-hydroxyethyl ketone compounds having the formula,

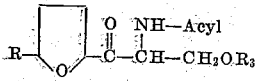

and 2-furyl aminomethyl ketone compounds having the formula,

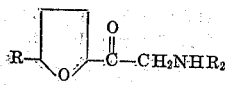

where R is hydrogen, —$NO_2$, halogen or a lower alkyl radical, $R_1$ and $R_3$ are the same or different and represent hydrogen or acyl radicals and $R_2$ is hydrogen, H·HAcid or an acyl radical, HAcid being one equivalent of an inorganic or organic acid. The term "acyl" as used herein includes saturated and unsaturated lower aliphatic acyl, halogen-substituted lower aliphatic acyl, carboxy-substituted lower aliphatic acyl, cyano-substituted lower aliphatic acyl, ether-substituted lower aliphatic acyl, ester-substituted lower aliphatic acyl, benzoyl, substituted benzoyl, araliphatic acyl, furoyl, pyridinoyl and the like radicals.

In its broader aspects the invention also includes the acid addition salts of the free bases of the 1-[2-furyl]-2-aminopropane-1,3-diol and 2-furyl aminomethyl ketone compounds. Some examples of such acid addition salts are the hydrochloride, hydrobromide, hydroiodide, sulfate, sulfamate, phosphate, acetate, citrate, oxalate, succinate, tartrate, phthalate, maleate, camphor sulfonate, bromcamphor sulfonate and the like.

It will be appreciated by those skilled in the art that the end products of the invention and their derivatives can exist in structural as well as optical isomeric forms. The term "structural" isomer or form as used herein refers to the cis or trans, that is, the planar relationship of the polar groups on the two asymmetric carbon atoms. To differentiate between these two possible diastereoisomers we will subsequently refer to the cis compounds as the "regular" [reg.] series or form and to the trans diastereoisomers as the "pseudo" [ψ] series or form. Such cis compounds are products wherein the two most highly polar of the groups on the asymmetric carbon atoms lie on the same side of the plane of the two carbon atoms. Conversely, the trans or pseudo compounds are those wherein the two most highly polar groups lie on opposite sides of the plane of the two carbon atoms.

Both the regular and pseudo forms exist as racemates of the optically active dextro [d] and levo [l] rotatory isomers as well as in the form of the individual or separated dextro [d] and levo [l] optical isomers.

Because of the difficulty of representing these structural differences in graphic formulae the customary structural formulae will be used in both the specification and claims and a notation placed below or to the side of the formula to designate the particular structural and optical configuration of the compound. Where the formula represents the unresolved mixture of the structural and optical isomers, the notation "unresolved" will be used. However, it should be expressly understood that where no notation appears with a structural formula the formula is to be interpreted in its generic sense, that is, as representing the [l]-ψ, [d]-ψ, [l]-reg. or [d]-reg. isomers in the separated form as well as the [dl]-ψ or the [dl]-reg. optical racemates or the total unresolved mixture of the structural and optical isomers. Such a formula does not merely represent the unresolved mixture of the isomers.

Our process for obtaining the compounds of the invention may be diagrammatically illustrated as follows:

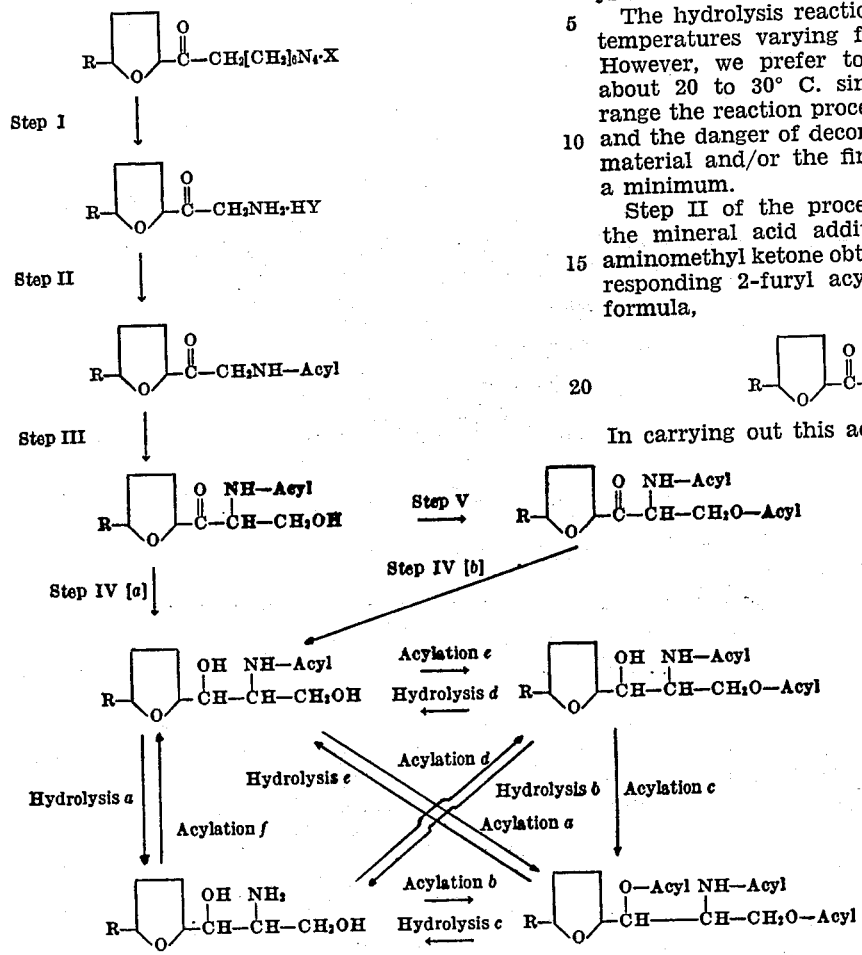

where X is a halogen atom, HY represents one equivalent of an inorganic mineral acid and R has the same significance as given above.

Step I of our process comprises hydrolyzing a 2-furyl halomethyl ketone-hexamethylenetetramine complex of the formula,

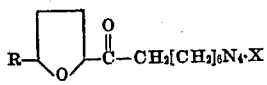

to the corresponding 2-furyl aminomethyl ketone acid addition salt. This hydrolysis is carried out in aqueous solution, using an inorganic mineral acid such as hydrochloric, hydrobromic, hydriodic, sulfuric or phosphoric acids as the hydrolytic agent. Due to the rather unstable nature of the 2-furyl aminomethyl ketone product, the excess hydrolytic agent must be removed either by distillation in the case of the voltatile acids or by precipitation as an insoluble metal salt in the case of the non-volatile acids as soon as the reaction is complete. Due to the ease of removal by distillation in vacuo the hydrohalic acids are the preferred hydrolytic agents. Where it is desired to proceed with step II of the process without isolation of the 2-furyl aminomethyl ketone compound, the excess hydrolytic agent need not be removed by the method set forth above but merely neutralized with a weakly alkaline substance such as an alkali metal acetate, phosphate, carbonate or bicarbonate. Regardless of the acid selected as the hydrolysis catalyst the 2-furyl aminomethyl ketone acid addition salt formed consists principally of the salt corresponding to the acid used in hydrolysis.

The hydrolysis reaction can be carried out at temperatures varying from about 0 to 50° C. However, we prefer to use a temperature of about 20 to 30° C. since in this temperature range the reaction proceeds at a reasonable rate and the danger of decomposition of the starting material and/or the final product is almost at a minimum.

Step II of the process comprises converting the mineral acid addition salt of the 2-furyl aminomethyl ketone obtained in step I to the corresponding 2-furyl acylamidomethyl ketone of formula,

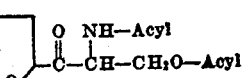

In carrying out this acylation an acid addition salt of the 2-furyl aminomethyl ketone must be employed as the starting material since the free bases of these amino ketones are rather unstable. However, in order for the acylation reaction to take place the 2-furyl aminomethyl ketone compound must be in the form of its free base or an organic acid addition salt and it is, therefore, necessary to generate simultaneously the free base or the organic acid addition salt in the reaction mixture and to acylate it. This is accomplished by carrying out the reaction in the presence of a weakly alkaline substance such as an alkali metal salt of an organic acid, an alkali or alkaline earth metal carbonate or bicarbonate, a tertiary organic base, a hydroxide of an amphoteric metal, calcium hydroxide and the like. Some specific examples of such weakly alkaline substances are sodium acetate, sodium bicarbonate, potassium bicarbonate, sodium carbonate, calcium carbonate, magnesium carbonate, pyridine, quinoline, triethylamine and aluminum hydroxide.

As acylating agents, acyl halides or acyl anhydrides can be employed in conjunction with either aqueous or non-aqueous reaction mediums. The temperature of the reaction is not particularly critical and can be varied over a considerable range without any significant deleterious effect upon the yields of the final products. In general, temperatures varying from about 0° C. to about 50° C. can be used although when a non-aqueous reaction mixture is employed the temperature can be increased slightly if desired.

The next step in the process, step III, comprises condensing the 2-furyl acylamidomethyl ketone produced in step II with formaldehyde in the presence of an alkaline condensation catalyst to obtain a 2-furyl-α-acylamido-β-hydroxyethyl ketone of formula,

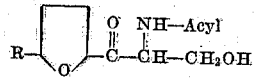

In carrying out this condensation the formaldehyde may be supplied to the reaction mixture in a number of different forms. For example, formaldehyde gas, aqueous or alcoholic solutions of formaldehyde, para-formaldehyde and other formaldehyde-yielding polymers may be used. In most cases it has been found preferable to use an excess of formaldehyde, usually up to about 4 or 5 mols, in order to insure completeness of the condensation reaction.

A variety of solvents, alkaline condensation catalysts and reaction conditions may also be employed. As solvents, either aqueous or anhydrous lower aliphatic alcohols are particularly advantageous but moist dialkyl ethers and dioxane-water mixtures may also be used. The alkaline condensation catalyst used in this phase of the invention may be organic bases, inorganic bases or inorganic salts of acidic or pseudo-acidic organic compounds. Some representative types of these catalysts are the hydroxides, oxides, carbonates, bicarbonates and amides of alkali or alkaline earth metals; alkali metal alkoxides; alkaline earth alkoxides; alkali metal phenolates; alkali metal salts of lower aliphatic carboxylic acids; organic tertiary amines and quaternary ammonium hydroxides of organic tertiary amines. In general, the weakly alkaline catalysts such as sodium bicarbonate, potassium bicarbonate, calcium hydroxide, pyridine, triethylamine, N-ethylmorpholine, N,N-dimethylaniline and the like are preferred since they make the reaction much easier to control. When strongly alkaline catalysts such as sodium hydroxide, potassium hydroxide, potassium carbonate, sodium methylate, sodium ethylate and the like are used, care must be taken to remove or inactivate the catalyst as soon as the reaction is completed in order to prevent the conversion of the desired product to the corresponding methylene bis compound by a dehydration and coupling reaction. Although the amount of catalyst is not critical and can vary from a few hundredths or thousandths of a mol to 1 mol or more, it is preferable from the standpoint of yields to use only enough to bring about a relatively rapid reaction. In most cases 0.05 mol or less is sufficient.

The temperature used in carrying out this methylolation reaction as well as the time required for its completion varies with the catalyst used. In general, the reaction can be carried out at a temperature between about 0 and 75° C. in a time varying from a few minutes to several hours. When strongly alkaline catalysts are used, the reaction proceeds very rapidly and is usually complete in a few minutes at room temperature or below. However, when mildly alkaline catalysts are employed, the reaction is not so rapid and usually requires from about fifteen minutes to several hours at room temperature or slightly above, that is, at about 25 to 50° C.

The reduction of the 2-furyl-α-acylamido-β-hydroxy- or β-acyloxyethyl ketone compounds to the corresponding 1-[2-furyl]-2-acylamidopropane-1,3-diols shown by steps IV [a] and [b] in the above diagram is carried out using an oxidizable aluminum alkoxide as the reductant. The reduction is carried out in an organic solvent which is usually a lower aliphatic alcohol and, preferably, the one corresponding to the alkoxide. The use of alkoxides of secondary alcohols such as of isopropanol and sec.-butanol is preferred since these alkoxides are more readily oxidized and hence milder reaction conditions can be employed. Alkoxides of tertiary alcohols such as that of tertiary butyl alcohol also produce good results. In general, the reaction can be effected over a wide temperature range but for most purposes a temperature between about 20 and 125° C. has been found satisfactory. Similarly, the amount of the oxidizable aluminum alkoxide in relationship to the quantity of the ketonic compound to be reduced can be varied within rather large limits. In most cases it is seldom necessary to employ more than about three equivalents of the alkoxide but, if desired, as little as one equivalent to as much as 20 or 30 equivalents can be used. When using an alkoxide derived from a secondary aliphatic alcohol in a solvent of the alcohol corresponding to the alkoxide, the preferred method of bringing about the reaction is to reflux the reaction mixture containing one or slightly more equivalents of the aluminum alkoxide and to distill off the oxidized alcohol [a lower aliphatic ketone] as it is formed in the reaction mixture.

The conversion of the 2-furyl-α-acylamido-β-hydroxy-ethyl ketone compounds to the corresponding β-acyloxy derivatives shown by step V in the above diagram can be effected by treating the β-hydroxy ketone compound with an acyl halide or acyl anhydride under substantially anhydrous conditions either alone or in the presence of an acylation catalyst such as an inorganic base, an alkaline salt of an organic acid, an organic tertiary base, an aromatic sulfonic acid or sulfuric acid. The acylation can, in general, be carried out at a temperature varying from about 10 to 140° C. but the preferred temperature for the reaction is between about 60 and 120° C. An inert organic solvent such as benzene, petroleum ether, toluene and the like can be used for the reaction, if desired, although in most instances it is preferable merely to use an excess of the acylating agent. Some of the catalysts which can be used to bring about the reaction in a shorter period of time are sodium hydroxide, potassium hydroxide, potassium carbonate, sodium acetate, pyridine, quinoline, triethylamine, N-ethylmorpholine, N-ethylpiperidine, N,N-dimethylaniline, p-toluenesulfonic acid and sulfuric acid.

The hydrolysis of the mono-, di- or tri-acylated 1-[2-furyl]-2-aminopropane-1,3-diol compounds to the corresponding 1-[2-furyl]-2-aminopropane-1,3-diols shown as hydrolysis [a], [b] and [c] in the above diagram can be effected with either alkaline or acidic hydrolysis catalysts or reagents. This hydrolysis reaction can be carried out using the unresolved racemic structural or the individual resolved optical and structural isomers of the acylated amino diols as starting materials. Dilute mineral acids such as hydrochloric, hydrobromic, hydriodic, phosphoric and sulfuric acids are the preferred hydrolytic agents as they are more efficient in bringing about complete hydrolysis in a shorter time with less destruction of the final product. When acid hydrolytic reagents such as the aforementioned mineral acids are employed, the 1-[2-furyl]-2-aminopropane-1,3-diol product is present in the reaction mixture in the form of an acid addition salt and it can either be isolated as such or the salt can be neutralized and the amino diol isolated as the free base. Among the many alkaline reagents which can be used to bring about the hydrolysis are the alkali or alkaline earth metal hydroxides, oxides, carbonates, amides, alkoxides and phenolates; quaternary ammonium hydroxides and strong tertiary organic nitrogen bases.

The hydrolysis of the di- or tri-acylated 1-[2-furyl]-2-aminopropane-1,3-diol compounds to the corresponding 1-[2-furyl]-2-acylamidopropane-1,3-diols as shown in the above diagram as hydrolysis [d] and [e] involves selectively hydrolyzing the 0-acyl groups present in the polyacylated amino diol compound. This is accomplished by treating the polyacylated amino diol starting compound with a strongly alkaline material dissolved in an aqueous solution containing a water-miscible organic solvent at about −20 to +50° C. Some of the strongly alkaline materials which can be used are the alkali metal hydroxides, the alkaline earth metal hydroxides and the alkali metal carbonates. This transformation can also be effected in a similar manner using a mildly alkaline material such as an alkali metal bicarbonate and heating the mixture at about 75 to 100° C. Suitable organic solvents for use in this reaction are, in general, lower aliphatic alcohols such as methanol, ethanol, isopropanol, isobutanol, lower aliphatic ketones such as acetone, methyl ethyl ketone and cyclic ethers such as dioxane. The preferred method of carrying out this selective hydrolysis is to maintain the temperature in the neighborhood of 25° C. and to use only a slight excess over the amount of strongly alkaline material necessary to bring about the hydrolysis of the 0-acyl group or groups. When carrying out the reaction in this fashion, the solvent of choice is about a 50% aqueous solution of a lower aliphatic alcohol such as methanol or a lower aliphatic ketone such as acetone.

As will be seen from the above diagram [see acylations [a], [b] and [c]], the completely acylated amino diols of the invention can be prepared by acylation of the free amino diol, its N-acylamido or its N-3-0-diacyl derivatives. The individual isomers or the optical racemates of the structural forms of the aforementioned starting materials as well as the unresolved form of the starting materials, can be employed in the practice of this phase of the invention. Generically speaking, the process for preparing these completely acylated amino diols involves acylating a compound of the formula,

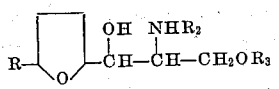

where R, R₂ and R₃ have the same significance as given above.

As acylating agents, either acyl halides or acyl anhydrides can be used. These acylating agents which are preferably employed under substantially anhydrous conditions can be used alone or in conjunction with alkaline catalysts such as the alkali or alkaline earth metal hydroxides, carbonates and oxides, the organic tertiary bases and the like. Some specific examples of suitable alkaline catalysts are sodium hydroxide, potassium hydroxide, lithium hydroxide, barium hydroxide, potassium carbonate, calcium oxide, pyridine, dimethylaniline, N-ethylpiperidine, N-ethylmorpholine, quinoline, triethylamine and the like. In general, when no alkaline catalyst is employed, the reactants must be heated together in order to bring about the reaction within a reasonable time. In most instances a heating period of several hours suffices. Where an alkaline catalyst is employed, heating is usually not necessary as the reaction proceeds with sufficient rapidity at moderate temperatures, that is, below about 50° C. In some instances, however, where the acyl halide or anhydride is not particularly reactive it is advantageous to carry out the reaction at a temperature above about 50° C.

This acylation process can also be carried out in an aqueous medium. This is most conveniently accomplished by using a two-phase reaction mixture, that is, one consisting of water and a water-immiscible organic solvent such as ethyl acetate, ether, chloroform and ethylene dichloride. In such a case it is preferable to carry out the reaction at about 25° C. or below and to employ a weakly alkaline material in conjunction with the acyl halide or anhydride. Some examples of the weakly alkaline materials which can be used are calcium carbonate, magnesium carbonate, barium carbonate and the like.

The 1-[2-furyl]-2-acylamido-3-acyloxypropane-1-ol compounds of the invention can be prepared as shown by the above diagram [see acylations d and e] by acylating the corresponding free amino diol or its N-acylamido derivative. These starting materials which have the general formula,

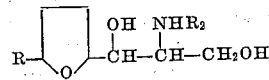

where R and R₂ have the same significance as given above, may be used in their unresolved form or in the form of their individual separated isomers or as an optical racemate of one of the two structural forms. As acylating agents, acyl anhydrides or halides, either alone or in conjunction with alkaline catalysts, may be used.

In carrying out the acylation under substantially anhydrous conditions with an acyl anhydride the reaction mixture is heated at about 60 to 135° C. for a short period of time. In most cases the reaction mixture need only be heated for about five to thirty minutes. If desired, the reaction can even be carried out at lower temperatures by allowing the reaction to proceed for a proportionately longer period of time. In general, however, the reaction is preferably carried out at about 70 to 100° C. for about one-half hour.

When an acyl halide is used as the acylating agent under substantially anhydrous conditions and in the absence of a catalyst, the reaction is carried out at a temperature below about 50° C. As a precaution against side reactions it is preferable to use only a slight excess of the acyl halide over that required for the reaction with the terminal hydroxyl group and, in the necessary instances, with the amino group.

When an alkaline catalyst is used in conjunction with either an acyl halide or anhydride the reaction can be carried out at a lower temperature within a shorter period of time. In general, the quantity of acylating agent should not be much in excess of that required to react with the terminal hydroxyl group and, where a free amino diol is used as the starting material, with the amino group. The preferred temperature for the reaction is in the range of 20-35° C. although the mixture can be heated to as high as 100° C. if desired.

If an alkaline catalyst is employed, the acylation can be carried out using an acyl halide in an aqueous medium at a temperature between about 0 and 35° C. As in some of the previously described modifications of the present acylation process, it is preferable to use only a slight excess of the acylating agent or the theoretically required amount. When the acyl groups are of a type which are readily hydrolyzed such as a lower aliphatic acyl group, the alkaline catalyst should be a relatively weak alkaline substance such as barium carbonate, calcium carbonate, magnesium carbonate, sodium acetate or the like. However, where the acyl groups are of a type more resistant to hydrolysis such as benzoyl or substituted benzoyl radicals, strongly alkaline catalysts such as sodium hydroxide and the like may be employed.

Some specific examples of the alkaline materials which can be used in the above described acylation processes are sodium hydroxide, potassium hydroxide, lithium hydroxide, sodium carbonate, potassium carbonate, sodium bicarbonate, sodium acetate, calcium hydroxide, calcium carbonate, barium carbonate, magnesium carbonate, barium hydroxide, pyridine, triethylamine, quinoline, N-ethylmorpholine, N-methylpiperidine and the like.

The 1-[2-furyl]-2-acylamidopropane-1,3-diol compounds of the invention can be prepared as has been described above by reduction or hydrolytic processes. These products can also be produced by mono acylation of the corresponding 1-[2-furyl]-2-aminopropane-1,3-diol as shown in the above diagram under acylation $f$. This latter method of preparation is of particular value where the product desired is an optically active isomer, since it is necessary to convert the optically racemic acylated products of the invention to the free amino diol in order to separate the optical racemate into its component isomers. It is also of value where the N-acylamido compound produced by the reduction or hydrolytic processes contains an acyl amido group other than the one desired in the final product. In such a case the N-acyl amido compound is hydrolyzed to the free amino diol [hydrolysis $a$ in the above diagram] and then the amino group of the free amino diol reacylated with the desired acyl group in accordance with the present mono acylation process.

In carrying out this mono acylation process the free amino diol is treated with an acylating agent under mild acylating conditions. In order to eliminate the possibility of polyacylation it is preferable to use either an ester type acylating agent under substantially anhydrous conditions or an acyl anhydride or halide under substantially anhydrous conditions at a low temperature or an acyl anhydride or halide in a mildly alkaline aqueous reaction medium.

Where an acyl ester is used as the acylating agent, the optimum reaction conditions are contingent upon the reactivity of the ester per se and also upon the reactivity of the potentially active substituents of the acyl portion of the molecule. Thus, for esters of a given acid the lower aliphatic alkyl esters are more reactive than the higher alkyl and are, therefore, the preferred type, the methyl esters being the preferred member of the lower alkyl types. In the case of a highly active ester of the type methyl dichloroacetate the reaction is substantially complete in periods of one-half to four hours at temperatures varying from 100° C. to 50° C. On the other hand, a relatively inert ester such as methyl benzoate does not react with the amino diol starting materials in practical time intervals so that a catalyst such as an alkali metal alcoholate is added to accomplish this in a reasonable time. Again, while methyl dichlorocetate reacts when heated with amino diols to form amides without substantial side reactions, the bromine atom of the corresponding methyl dibromoacetate at 100° C. reacts further to form cyclic amide ethers which are undesirable products. This side reaction is avoided by using a lower reaction temperature, that is, 40 to 60° C. in this instance or by the use of an inert diluent such as alcohol.

When the acylation is carried out using an acyl anhydride or halide under substantially anhydrous conditions the temperature should be kept below about 15° C. and preferably in the neighborhood of about 0° C. It is also preferable from the standpoint of increased yields and ease in controlling the temperature to carry out the reaction in an inert organic solvent. Some suitable solvents for this purpose are esters of lower fatty acids such as ethyl acetate, lower aliphatic ketones such as acetone and methylethyl ketone, cyclic ethers such as dioxane, hydrocarbons such as benzene and toluene and halogenated aliphatic hydrocarbons such as ethylene dichloride and chloroform.

The acylation in an aqueous reaction medium using an acyl halide or anhydride as the acylating agent is effected at a pH greater than 7 and at a temperature below the boiling point of the mixture. Water alone or water together with a water-miscible or immiscible organic solvent is used as the reaction medium. In general, water alone is satisfactory in most instances but where the amino diol starting material is quite insoluble it is sometimes advantageous to add a water-miscible organic solvent such as methanol, ethanol or acetone to increase its water solubility and facilitate the reaction. In other instances, however, where the acylating agent is quite reactive, it is sometimes preferable to employ a two-phase system in order to minimize exposure of the final product to the unreacted acylating agent. This is accomplished by carrying out the reaction in a mixture of water and a water-immiscible organic solvent such as ethyl acetate, ether, benzene, xylene, chloroform, carbon tetrachloride and the like. Some examples of the alkaline materials which can be used for maintaining the alkalinity of the reaction mixture are the alkali metal acetates, carbonates, bicarbonates, hydroxides and phosphates, the alkaline earth hydroxides and organic bases such as pyridine and N-ethylmorpholine, triethylamine and the like.

Although several different procedures for carrying out the N-monoacylation of the amino diol starting compounds have been described above, there are, of course, instances where the use of one method or procedure is preferable. Similarly, the optimal conditions or reagents used in conjunction with one procedure vary somewhat in the individual cases. For example, when an acyl group containing at least one α-halogen atom is desired on the amino nitrogen atom in the final product, the choice of the method of acylation is to some extent dependent upon the reactivity of the halogen atom or atoms.

Thus, in the case of the mono-, di- and tri-fluoro and -chloro acetic acids the halogens are relatively inert and the acylamido diol compounds of the invention may be prepared by any of the methods described above with about equal success. However, where the halogen atoms are more reactive as in the case of the α-bromo and the α-iodo aliphatic acids, the preferred and best method for preparing the corresponding acylamido diol compounds is to react the amino diol with a haloacyl halide in a substantially anhydrous organic solvent such as ethyl acetate.

As pointed out above, the amino diols of the invention and their acylated derivatives can exist in structural as well as optical isomeric forms. Where a particular optical isomeric form or optical racemate of one of the two structural forms of the products is desired, it is necessary to separate the unresolved amino diol or acylated amino diol into its two component structural isomers. This is accomplished quite readily and completely by utilization of the differences in solubility of the two forms in water, organic solvents or in water-organic solvent mixtures. Some of the organic solvents which can be used in this fractional crystallization or solubilization are lower aliphatic alcohols, acetone, chloroform, ethyl acetate and the like. In some cases the solvent solubility differential of the two forms is not great enough to afford a clean cut separation of the two structural isomers and in these cases it is preferable to convert the isomer mixture of the free amino diol or acylated amino diol into another acylated derivative of the amino diol whose structural isomers differ more markedly in their solubility characteristics. The structural isomers of this new acylated amino diol can then be separated by fractional crystallization and the appropriate structural form of the product so obtained converted either by acylation or hydrolysis to the desired structural form of the free amino diol or acylated amino diol.

Where a particular optical isomer of the amino diol or acylated derivative thereof is desired, the corresponding individual reg. or ψ structural form of the 1-[2-furyl]-2-aminopropane-1,3-diol is resolved into its optical isomers via an optically active acid addition salt. This resolution which must be carried out on the free amino diol is performed by forming an acid addition salt of the racemic amine with an optically active acid such as [d]-tartaric, [l]-tartaric, [d]-mandelic, [l]-mandelic, [d]-bromcamphor sulfonic, [l]-bromcamphor sulfonic, [d]-camphor sulfonic, and [l]-camphor sulfonic acids, separating the two isomeric salts by recrystallization from a solvent such as a lower aliphatic alcohol or mixtures of the same with water or other organic solvents and then regenerating the individual optical isomers from the separated optically active acid addition salts by neutralizing each one separately. When carrying out this resolution it is desirable, but not absolutely necessary, to choose the form of the optically active acid so that the desired optical isomer will separate from the crystallization solution first.

The products of the invention are useful as intermediates in the preparation of other organic compounds. They are of particular value in the preparation of organic compounds possessing antibiotic activity against microorganisms of the Rickettsia type. Some of the N-acylamido diols of the invention are per se antibiotics and exhibit novel antibiotic activity against various Rickettsia and gram negative bacteria. The invention is illustrated by the following examples.

Example 1

[a] 228 g. of 5-nitro-2-furyl bromomethyl ketone dissolved in a small amount of carbon tetrachloride is added to 150 g. of hexamethylenetetramine in 1 liter of carbon tetrachloride. The mixture is allowed to stand at room temperature for about three hours and the 5-nitro-2-furyl bromomethyl ketone-hexamethylenetetramine complex which separates collected, washed with a little chloroform and dried. The formula of this product is,

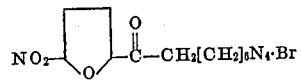

[b] 350 g. of 5-nitro-2-furyl bromomethyl ketone-hexamethylenetetramine complex is added to 1500 cc. of 6 N hydrochloric acid and the mixture allowed to stand at room temperature for one hour. The reaction mixture is evaporated to dryness in vacuo at room temperature to obtain the desired 5-nitro-2-furyl aminomethyl ketone hydrochloride. This product has the formula,

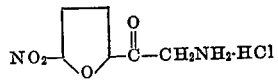

[c] 150 g. of 5-nitro-2-furyl aminomethyl ketone hydrochloride is dissolved in a mixture composed of 1 liter of glacial acetic acid and 300 cc. of acetic anhydride. 85 g. of sodium acetate is added in small portions with stirring to the mixture and after the addition has been completed the solution is diluted with water. The insoluble 5-nitro-2-furyl acetamidomethyl ketone which separates from the solution is collected, washed with a small amount of water and dried. The formula of this product is,

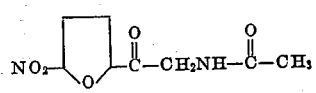

[d] 100 g. of 5-nitro-2-furyl acetamidomethyl ketone is mixed with 500 cc. of methanol and 150 cc. of 40% formalin. 5 g. of sodium bicarbonate is added and the mixture stirred at room temperature for about one hour. During this time the desired solid product separates. The product is collected and purified by recrystallization from ethyl acetate. The material thus obtained is 5-nitro-2-furyl α-acetamido-β-hydroxyethyl ketone which has the following formula,

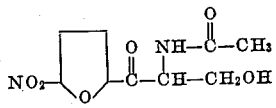

[e] 105 g. of 5-nitro-2-furyl α-acetamido-β-hydroxyethyl ketone is mixed with 180 g. of aluminum isopropylate and 2 liters of isopropanol. The resulting mixture is heated under reflux for five hours during which time the acetone formed by the reaction is distilled off and a stream of nitrogen is passed through the solution. After the reaction is completed the isopropanol is distilled from the reaction mixture under reduced pressure and the residue treated with about 2 liters of water. The mixture is heated to boiling to insure complete precipitation of the aluminum hydroxide, filtered while hot and the filtrate allowed to cool. The [dl]-ψ-1-[5-nitro-2-furyl]-2-acetamidopropane-1,3-diol which separates from the solution is collected by filtration and purified by recrystallization from dilute ethanol. The formula of this product is,

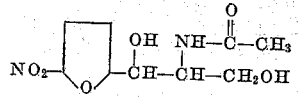

[dl]-ψ Form

The aqueous reaction mixture filtrate is saturated with sodium chloride, extracted exhaustively with ethyl acetate and the ethyl acetate extracts dried. Distillation of the ethyl acetate in vacuo yields a residue consisting of a mixture of the [dl]-ψ and [dl]-reg.-1-[5-nitro-2-furyl]-2-acetamidopropane-1,3-diols. Fractional crystallization of this mixture first from alcohol and then from water yields an additional quantity of the [dl]-ψ-1-[5-nitro-2-furyl]-2-acetamidopropane-1,3-diol and the desired [dl]-reg.-1-[5-nitro-2-furyl]-2-acetamidopropane-1,3-diol. This latter compound has the formula,

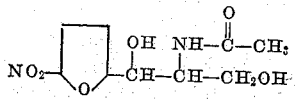

[dl]-Reg. Form

[f] A mixture consisting of 50 g. of [dl]-ψ-1-[5-nitro-2-furyl]-2-acetamidopropane-1,3-diol and 200 cc. of 1 N hydrochloric acid is allowed to stand at room temperature for twenty-four hours. The reaction mixture is evaporated to dryness in vacuo to obtain the desired [dl]-ψ-1-[5-nitro-2-furyl]-2-aminopropane-1,3-diol hydrochloride. The free base is obtained by dissolving the hydrochloride salt in water and treating the resulting solution with about 50 cc. of 6 N ammonium hydroxide. The insoluble free base is collected, washed with a small amount of water and dried. The formula of this free base of [dl]-ψ-1-[nitro-2-furyl]-2-aminopropane-1,3-diol is,

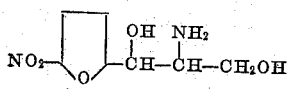

[dl]-ψ Form

Treatment of the [dl]-reg.-1-[5-nitro-2-furyl]-2-acetamidopropane-1,3-diol in a similar manner yields the hydrochloride and free base of [dl]-reg.-1-[5-nitro-2-furyl]-2-aminopropane-1,3-diol.

[g] A mixture consisting of 14.6 g. of [dl]-ψ-1-[5-nitro-2-furyl]-2-aminopropane-1,3-diol and 7.4 g. of [d]-tartaric acid in 150 cc. of methanol is heated to boiling for one hour and the crystalline precipitate collected. After an additional digestion or two with about 100 cc. portions of methanol the crystals consisting of the [d]-tartaric acid salt of [l]-ψ-1-[5-nitro-2-furyl]-2-aminopropane-1,3-diol are collected. The tartrate salt thus obtained is dissolved in a small amount of water, treated with an excess of sodium hydroxide until the pH of the solution rises to about 10 and the crystalline free base of [l]-ψ-1-[5-nitro-2-furyl]-2-aminopropane-1,3-diol which separates collected. Recrystallization from hot water yields the pure product which has the formula,

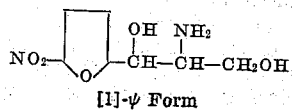

[l]-ψ Form

The methanol reaction mixture filtrate from the formation of the tartrate salt is evaporated to dryness in vacuo to obtain a mixture containing the [d]-tartaric acid salt of [d]-ψ-1-[5-nitro-2-furyl]-2-aminopropane-1,3-diol. Recrystallization of this mixture from water yields the pure [d]-tartaric salt of the [d]-ψ isomer which may be converted to the free [d]-ψ-1-[5-nitro-2-furyl]-2-aminopropane-1,3-diol by treatment with sodium hydroxide solution in the manner described above. The formula of the free base of this product is,

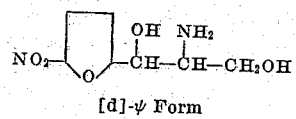

[d]-ψ Form

[h] 4 g. of [l]-ψ-1-[5-nitro-2-furyl]-2-aminopropane-1,3-diol is heated with 5 g. of methyl dichloroacetate in 20 cc. of methanol for one hour at 55° C. The reaction mixture is evaporated to dryness in vacuo and the residue recrystallized from water to obtain the desired [l]-ψ-1-[5-nitro-2-furyl]-2-dichloroacetamidopropane-1,3-diol of formula,

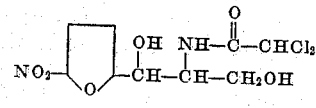

[l]-ψ Form

[i] 6 g. of [dl]-ψ-1-[5-nitro-2-furyl]-2-aminopropane-1,3-diol is heated with 7.5 g. of methyl dichloroacetate in 30 cc. of methanol at 55° C. for one hour. The reaction mixture is evaporated to dryness in vacuo and the residue recrystallized from water to obtain the desired [dl]-ψ-1-[5-nitro-2-furyl]-2-dichloroacetamidopropane-1,3-diol of formula,

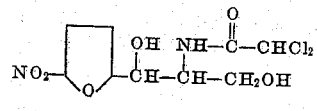

[dl]-ψ Form

[j] 5.6 g. of [dl]-ψ-1-[5-nitro-2-furyl]-2-aminopropane-1,3-diol is shaken with 4 g. of benzoyl chloride in 40 cc. of cold 1 N sodium hydroxide solution. The crystalline is separated, washed with dilute hydrochloric acid, then with sodium bicarbonate solution and finally with water. Recrystallization from aqueous methanol yields the desired [dl]-ψ-1-[5-nitro-2-furyl]-2-benzamidopropane-1,3-diol of formula,

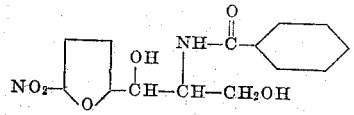

[dl]-ψ Form

[k] A mixture consisting of 2 g. of [dl]-ψ-1-[5-nitro-2-furyl]-2-aminopropane-1,3-diol, 4 g. of acetic anhydride and 2.5 g. of dry pyridine is allowed to stand at room temperature for three hours. The reaction mixture is diluted with water, the insoluble product collected and purified by recrystallization from a small amount of methanol. The product thus obtained is the triacetate of [dl]-ψ-1-[5-nitro-2-furyl]-2-aminopropane-1,3-diol. It has the formula,

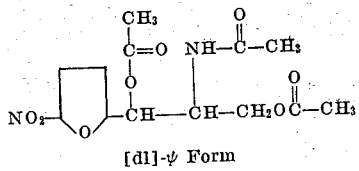

[dl]-ψ Form

[l] A mixture consisting of 1.3 g. of [dl]-ψ-1-[5-nitro-2-furyl]-2-aminopropane-1,3-diol and 3.5 g. of acetic anhydride is heated at 70° C. for ten minutes. The reaction mixture is evaporated to dryness in vacuo and the residue purified by recrystallization from a small amount of methanol. The product thus obtained is [dl]-ψ-1-[5-nitro-2-furyl]-2-acetamido-3-acetoxypropane-1-ol of formula,

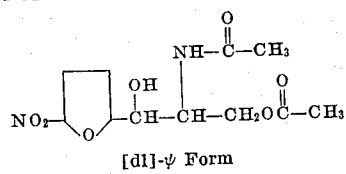

[dl]-ψ Form

[m] 1 g. of [dl]-ψ-1-[5-nitro-2-furyl]-2-acetamido-3-acetoxypropane-1-ol, 2 g. of acetic anhydride and 1 cc. of dry pyridine is allowed to stand at room temperature for about three hours. The reaction mixture is diluted with water, the insoluble product collected and purified by recrystallization from a small amount of methanol. The product thus obtained is the triacetate of [dl]-ψ-1-[5-nitro-2-furyl]-2-aminopropane-1,3-diol. This product is identical in all respects with that obtained by the procedure described in paragraph [k] above.

[n] A two-phase system consisting of 60 cc. of 1 N potassium hydroxide and an equal volume of ether, 2 g. of [dl]-ψ-1-[5-nitro-2-furyl]-2-aminopropane-1,3-diol and 2 g. of p-nitrobenzoyl chloride is shaken at 0° C. for ten minutes. The insoluble product which separates from the reaction mixture is collected, washed with water and purified by recrystallization from alcohol. This product is [dl]-ψ-1-[5-nitro-2-furyl]-2-[p'-nitrobenzamido]propane-1,3-diol of formula,

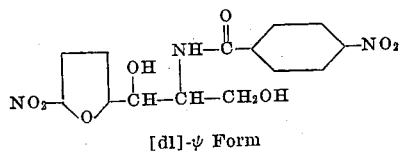

[dl]-ψ Form

[o] 1 g. of [dl]-ψ-1-[5-nitro-2-furyl]-2-aminopropane-1,3-diol in 30 cc. of ethyl acetate is treated with 1 cc. of furoyl chloride at 0° C. After one-half hour water is added and the ethyl acetate layer separated. The organic layer is washed with dilute acid, then with sodium bicarbonate solution and finally with water. The ethyl acetate is removed by distillation in vacuo and the residue crystallized from water to obtain the desired [dl]-ψ-1-[5-nitro-2-furyl]-2-furoylamidopropane-1,3-diol. This product has the formula,

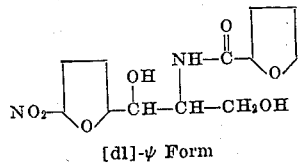

[dl]-ψ Form

[p] 0.12 g. of sodium methoxide is added to a solution consisting of 4 g. of [dl]-ψ-1-[5-nitro-2-furyl]-2-aminopropane-1,3-diol and 5 g. of ethyl β,β-dimethyl acrylate in 50 cc. of dry methanol. The mixture is warmed for one-half hour, the alkali neutralized by the addition of 2 cc. of 1 N hydrochloric acid and the methanol distilled off in vacuo. The residue which consists of sodium chloride and the desired product is extracted with ethylene dichloride, the extracts filtered and the desired compound crystallized from the filtrates. Recrystallization from water yields the pure [dl]-ψ-1-[5-nitro-2-furyl]-2-β,β-dimethylacrylylamidopropane-1,3-diol of formula,

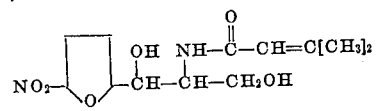

[dl]-ψ Form

[q] 2 g. of succinic anhydride is added to 4 g. of [dl]-ψ-1-[5-nitro-2-furyl]-2-aminopropane-1,3-diol in 40 cc. of water and the mixture heated for about thirty minutes. The reaction mixture is allowed to stand overnight at 25° C. and the crystalline [dl]-ψ-1-[5-nitro-2-furyl]-2-β-carboxypropionamidopropane-1,3-diol collected. This product which has the formula,

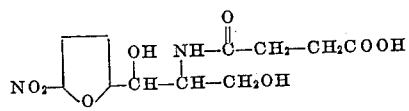

[dl]-ψ Form may be purified, if desired, by recrystallization from water.

*Example 2*

[a] 75 g. of hexamethylenetetramine dissolved in 100 cc. of carbon tetrachloride is added to 95 g. of 2-furyl bromomethyl ketone in 400 cc. of carbontetrachloride. The solid reaction product begins to separate almost immediately and the temperature of the reaction mixture rises somewhat. After allowing the mixture to stand for about two hours the 2-furyl bromomethyl ketone-hexamethylenetetramine complex is collected, washed with a little carbon tetrachloride and dried. The formula of this product is,

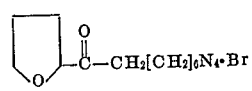

[b] 150 g. of 2-furyl bromomethyl ketone-hexamethylenetetramine complex is added to 800 cc. of 6 N hydrochloric acid and the mixture allowed to stand at room temperature for about forty-five minutes. The reaction mixture is evaporated to dryness in vacuo to obtain the desired 2-furyl aminomethyl ketone hydrochloride which has the formula,

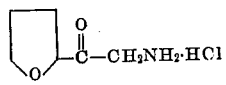

[c] 50 g. of 2-furyl aminomethyl ketone hydrochloride is added to a mixture composed of 400 cc. of glacial acetic acid and 100 cc. of acetic anhydride. 40 g. of sodium acetate is added in small portions with stirring and after a few minutes the reaction mixture diluted with water. The insoluble 2-furyl acetamidomethyl ketone is collected, washed with water and dried. This product has the formula,

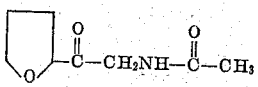

[d] A mixture consisting of 40 g. of 2-furyl acetamidomethyl ketone, 80 cc. of 40% formalin, 2 g. of sodium bicarbonate and 350 cc. of methanol is warmed at 45° C. for one-half hour. The reaction mixture is allowed to stand for one hour and then poured into 2 liters of ice water. The precipitated product is collected, washed with water and purified by recrystallization from ethyl acetate or ethanol to obtain the pure 2-furyl α-acetamido-β-hydroxyethyl ketone of formula,

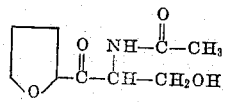

[e] g. of 2-furyl α-acetamido-β-hydroxyethyl ketone is mixed with 80 g. of aluminum isopropylate and 1 liter of isopropanol and the resulting mixture heated under reflux for five hours. During the refluxing period the acetone which is formed is distilled off and a stream of nitrogen is passed through the solution. The isopropanol is distilled from the reaction mixture under reduced pressure and the residue treated with about 1 liter of water. The mixture is heated to boiling to insure complete precipitation of the aluminum hydroxide, filtered while hot and the filtrate allowed to cool. The [dl]-ψ-1-[2-furyl]-2-acetamidopropane-1,3-diol which separates from the cooled solution is collected by filtration and purified by recrystallization from dilute alcohol. The formula of this product is,

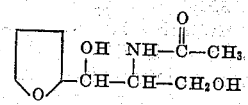

[dl]-ψ Form

Saturation of the aqueous reaction mixture filtrate with salt followed by extraction with ethyl acetate yields an additional quantity of the [dl]-ψ isomer together with the [dl]-reg.-1-[2-furyl]-2-acetamidopropane-1,3-diol. These structural isomers can be separated, if desired, by fractional crystallization from alcohol or water.

[f] 12 g. of 2-furyl α-acetamido-β-hydroxyethyl ketone is added to 20 cc. of acetic anhydride and 0.1 cc. of concentrated sulfuric acid added to the mixture. The reaction mixture is heated at 60° C. for one-half hour, cooled and evaporated to dryness in vacuo. The residue is treated with water, the insoluble 2-furyl α-acetamido-β-acetoxyethyl ketone collected, washed with a small amount of water and dried. The formula of this product is,

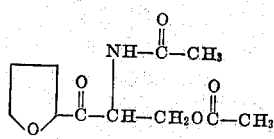

[g] 30 g. of 2-furyl α-acetamido-β-acetoxyethyl ketone and 60 g. of aluminum isopropylate is added to 500 cc. of anhydrous isopropanol. The resulting mixture is refluxed for about five hours during which time the acetone is distilled from the mixture as it is formed and a stream of nitrogen is passed through the solution. The isopropanol is removed from the reaction mixture by distillation in vacuo and the residue treated with about 1 liter of water. The mixture is heated to boiling, filtered while hot and the filtrate allowed to cool. The [dl]-ψ-1-[2-furyl]-2-acetamidopropane-1,3-diol which separates from the cooled solution is collected, washed with a small amount of water and purified by recrystallization from dilute alcohol. This product is identical in all respects with that prepared by the method described in paragraph [e] above.

If desired, further quantities of the [dl]-ψ-1-[2-furyl]-2-acetamidopropane-1,3-diol, as well as the [dl]-reg. isomer of 1-[2-furyl]-2-acetamidopropane-1,3-diol can be isolated from the aqueous reaction mixture filtrates by the procedure described in paragraph [e] above.

[h] 25 g. of [dl]-ψ-1-[2-furyl]-2-acetamidopropane-1,3-diol is added to 150 cc. of 1 N hydrochloric acid and the reaction mixture allowed to stand overnight at room temperature. The reaction mixture is evaporated to dryness in vacuo and the residual [dl]-ψ-1-[2-furyl]-2-aminopropane-1,3-diol hydrochloride collected. The hydrochloride salt thus obtained is added to 16 cc. of concentrated ammonium hydroxide and 50 cc. of water. The free base of [dl]-ψ-1-[2-furyl]-2-aminopropane-1,3-diol which separates is collected, washed with water and purified, if desired, by recrystallization from water. The formula of this product is,

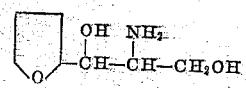

[dl]-ψ Form

[i] 6 g. of the free base of [dl]-ψ-1-[2-furyl]-2-aminopropane-1,3-diol is dissolved in a small amount of warm n-butanol and added to a solution containing an equivalent amount of [d]-camphor sulfonic acid. The resulting mixture is cooled and the solid which separates collected and recrystallized twice from n-butanol. The product thus obtained is the [d]-camphor sulfonate of [l]-ψ-1-[2-furyl]-2-aminopropane-1,3-diol. This salt is dissolved in a small amount of water containing an excess of sodium hydroxide and the insoluble free base of [l]-ψ-1-[2-furyl]-2-aminopropane-1,3-diol collected, washed with water and dried. The formula of this product is,

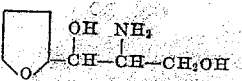

[l]-ψ Form

[j] A mixture consisting of 3 g. of [l]-ψ-1-[2-furyl]-2-aminopropane-1,3-diol and 3 g. of methyl dichloroacetate in 25 cc. of methanol is heated at 50° C. for forty-five minutes. The reaction mixture is evaporated to about one-half volume, diluted with carbon tetrachloride and allowed to cool. The crystalline [l]-ψ-1-[2-furyl]-2-dichloroacetamidopropane-1,3-diol which separates from the cooled solution is collected, washed with a small amount of fresh solvent and purified further, if desired, by recrystallization from dilute alcohol or ethylene dichloride. The formula of this product is,

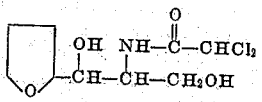

[l]-ψ Form

[k] A mixture consisting of 2 g. of [dl]-ψ-1-

[2-furyl]-2-aminopropane-1,3-diol and 2 g. of methyl dichloroacetate in 10 cc. of methanol is heated at 55° C. for forty-five minutes. The reaction mixture is diluted with two and one-half volumes of carbon tetrachloride and evaporated to a total volume of about 10 cc. The crystalline [dl] - ψ - 1 - [2-furyl] - 2 - dichloroacetamidopropane-1,3-diol which separates from the solution on cooling is collected and purified, if desired, by recrystallization from ethylene dichloride. The formula of this product is,

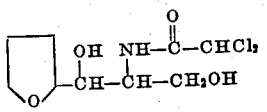

[dl]-ψ Form

[l] A mixture consisting of 2 g. of [dl]-ψ-1-[2-furyl]-2-aminopropane - 1,3 - diol, 10 cc. of dry pyridine and 10 cc. of benzoyl chloride is allowed to stand at room temperature for about twenty-four hours. The reaction mixture is poured into about 300 cc. of ice water and the precipitated product collected. The crude tribenzoate of [dl]-ψ-1-[2-furyl]-2-aminopropane-1,3-diol thus obtained is washed with a small amount of sodium bicarbonate solution, water, dilute hydrochloric acid and finally again with water. Recrystallization from alcohol yields the pure product which has the formula,

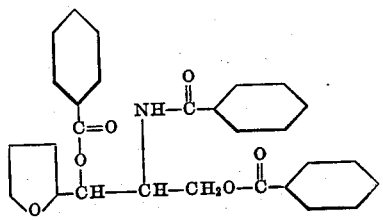

[dl]-ψ Form

*Example 3*

[a] 175 g. of 5-methyl-2-furyl bromomethyl ketone-hexamethylenetetramine complex is added to 1 liter of 6 N hydrobromic acid and the resulting mixture allowed to stand at room temperature for about forty-five minutes. The reaction mixture is evaporated to dryness in vacuo to obtain the desired 5-methyl-2-furyl aminomethyl ketone hydrobromide of formula,

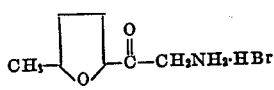

[b] 55 g. of 5-methyl-2-furyl aminomethyl ketone hydrobromide is added to a mixture consisting of 70 g. of dry pyridine and 50 g. of phenyl acetyl chloride, keeping the temperature below about 5° C. After stirring for about one hour 1 liter of cold water is added and the precipitated product collected. The product thus obtained is 5-methyl-2-furyl phenylacetamidomethyl ketone of formula,

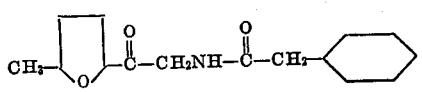

[c] A mixture consisting of 52.5 g. of 5-methyl-2-furyl phenylacetamido ketone, 2 g. of sodium bicarbonate and 80 cc. of 40% formalin in 350 cc. of methanol is warmed at 45° C. for one-half hour. The reaction mixture is allowed to stand at room temperature for about one hour and then poured into 3 liters of ice water. The precipitated product is collected, washed with water and purified by recrystallization from ethyl acetate to obtain the pure 5-methyl-2-furyl α-phenylacetamido-β-hydroxyethyl ketone of formula,

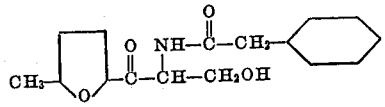

[d] 55 g. of 5-methyl-2-furyl α-phenylacetamido-β-hydroxyethyl ketone is mixed with 75 g. of aluminum isopropylate and 1 liter of isopropanol. The resulting mixture is heated under reflux for five hours during which time the acetone which is formed is distilled and a stream of nitrogen passed through the solution. The isopropanol is distilled from the reaction mixture under reduced pressure and the residue treated with about 1 liter of cold water. The mixture is heated to boiling, filtered while hot and the filtrate allowed to cool. The [dl]-ψ-1-[5-methyl-2-furyl] - 2 - phenylacetamidopropane - 1,3 - diol which separates from the cool solution is collected by filtration and purified by recrystallization from dilute ethanol. The formula of this product is,

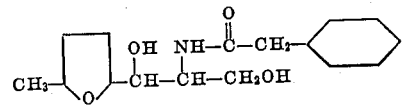

[dl]-ψ Form

[e] A mixture consisting of 25 g. of [dl]-ψ-1-[5-methyl-2-furyl]-2-phenylacetamidopropane-1,3-diol and 100 cc. of 1 N hydrochloric acid is allowed to stand at room temperature for about twenty-four hours. The reaction mixture is evaporated to dryness in vacuo to obtain a mixture of the hydrochloride salt of [dl]-ψ-1-[5-methyl-2-furyl]-2-aminopropane - 1,3 - diol hydrochloride and phenyl acetic acid. The residual mixture is taken up in water, treated with sodium hydroxide solution until the pH of the mixture reaches 10 and the insoluble precipitate collected by filtration. The precipitate which consists of the free base of [dl]-ψ-1-[5-methyl-2-furyl]-2-aminopropane-1,3-diol is washed with water and purified, if desired, by recrystallization from dilute alcohol or water. The formula of this product is,

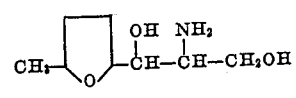

[dl]-ψ Form

[f] 1 g. of methoxy acetyl chloride is added to a solution of 1.7 g. of [dl]-ψ-1-[5-methyl-2-furyl]-2-aminopropane-1,3-diol dissolved in ethyl acetate at 0° C. After thirty minutes the reaction mixture is washed with a small amount of water, then with a small amount of saturated sodium bicarbonate solution and finally with a fresh portion of water. The ethyl acetate layer is dried, concentrated to a volume of a few cc. and diluted with petroleum ether until the solution becomes cloudy. The solution is allowed to stand in the refrigerator until the crystalline [dl]-ψ-1-[5-methyl-2-furyl] - 2 - methoxyacetamidopropane-1,3-diol separates. This product which has the formula,

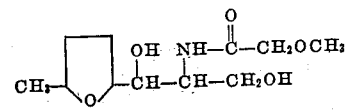

[dl]-ψ Form is collected, washed with a small amount of ethyl acetate and dried.

[g] A mixture consisting of 1.5 g. of [dl]-ψ-1-[5-methyl-2-furyl]-2-methoxyacetamidopropane-1,3-diol, 10 cc. of dry pyridine and 10 cc. of phenyl acetyl chloride is allowed to stand at room temperature for about twenty-four hours. The reaction mixture is poured into about 300 cc. of ice water and the precipitated product collected. The crude [dl]-ψ-1-[5-methyl-2-furyl]-2-methoxyacetamido-1,3-diphenylacetoxypropane thus obtained is washed with sodium bicarbonate solution, water, dilute hydrochloric acid and finally again with water. Recrystallization from alcohol yields the pure compound which has the formula,

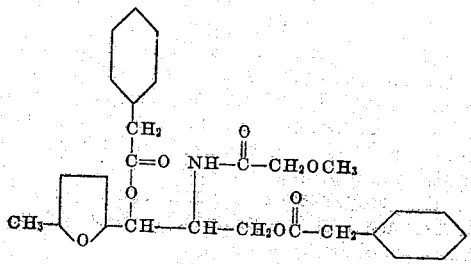

[dl]-ψ Form

[h] A mixture consisting of 2 g. of [dl]-ψ-1-[5-methyl-2-furyl]-2-aminopropane-1,3-diol, 2 g. of ethyl cyanoacetate, 0.05 g. of sodium methoxide and sufficient methanol to dissolve the reactant is heated under reflux for about one-half hour. 1 cc. of 1 N hydrochloric acid is added, the methanol evaporated off in vacuo and the residue diluted with water. The insoluble [dl]-ψ-1-[5-methyl-2-furyl]-2-cyanoacetamidopropane-1,3-diol is collected, washed with a small amount of water and dried. The formula of this product is,

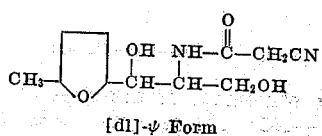

[dl]-ψ Form

[i] 0.05 g. of sodium methoxide is added to a solution consisting of 2 g. of [dl]-ψ-1-[5-methyl-2-furyl]-2-aminopropane-1,3-diol and 2 g. of ethyl lactate in 100 cc. of dry methanol. The mixture is refluxed for one-half hour, 1 cc. of 1 N hydrochloric acid added and the methanol removed by distillation in vacuo. The residue is taken up in hot ethyl acetate, the extract filtered to remove the sodium chloride and the filtrate chilled. The crystalline product thus obtained is [dl]-ψ-1-[5-methyl-2-furyl]-2-lactamidopropane-1,3-diol of formula,

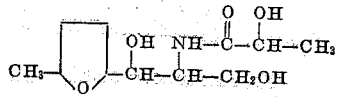

[dl]-ψ Form

[j] A mixture consisting of 2 g. of [dl]-reg.-1-[5-methyl-2-furyl]-2-aminopropane-1,3-diol, 0.05 g. of sodium methoxide and 2 g. of methyl nicotinate in 75 cc. of dry methanol is refluxed for about one-half hour. The alkali is neutralized by the addition of 1 cc. of 1 N hydrochloric acid and the methanol distilled off in vacuo. The residue is extracted with hot ethyl acetate, the ethyl acetate extract filtered to remove the salt and the filtrate chilled. The crystalline product thus obtained is [dl]-reg.-1-[5-methyl-2-furyl]-2-[3'-pyridinoylamino]propane-1,3-diol of formula,

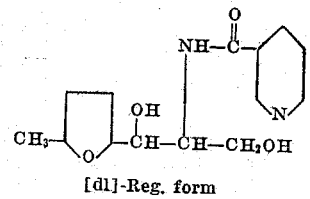

[dl]-Reg. form

Example 4

[a] 200 g. of 5-iodo-2-furyl bromomethyl ketone-hexamethylenetetramine complex is added to 1 liter of 6 N hydrochloric acid and the mixture allowed to stand at room temperature for about one hour. The reaction mixture is evaporated to dryness in vacuo at room temperature to obtain the desired 5-iodo-2-furyl aminomethyl ketone hydrochloride of formula,

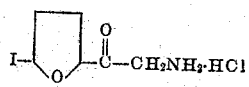

[b] A mixture consisting of 45 g. of 5-iodo-2-furyl aminomethyl ketone hydrochloride, 50 g. of benzoic anhydride and 6 g. of sodium acetate is heated to about 45° C. and stirred as small amounts of ice and water are added from time to time. After about one hour the mixture is diluted with water, cooled, adjusted to pH 8 with sodium hydroxide and the desired 5-iodo-2-furyl benzamidomethyl ketone which separates collected. The product is washed with water and dried. It has the formula,

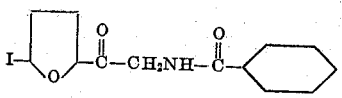

[c] A mixture consisting of 22.5 g. of 5-iodo-2-furyl benzamidomethyl ketone, 1 g. of sodium bicarbonate and 6 g. of paraformaldehyde in 300 cc. of methanol is warmed at 45° C. for one-half hour. The reaction mixture is allowed to stand at room temperature for about one hour and then poured into about one and one-half liters of ice water. The precipitated product is collected, washed with water and purified by recrystallization from ethyl acetate to obtain the pure 5-iodo-2-furyl α-benzamido-β-hydroxyethyl ketone of formula,

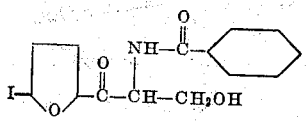

[d] A mixture consisting of 52.5 g. of 5-iodo-2-furyl α-benzamido-β-hydroxyethyl ketone, 60 g. of aluminum isopropylate and 1 liter of isopropanol is heated under reflux for about five hours during which time the acetone is distilled from the mixture as it is formed. The isopropanol is distilled from the reaction mixture under reduced pressure and treated with about 1 liter of water. The mixture is heated to boiling, cooled and acidified with dilute hydrochloric acid to dissolve the aluminum hydroxide. The insoluble 1-[5-iodo-2-furyl]-2-benzamidopropane-1,3-diol is collected and separated into its structural forms by fractional crystallization from methanol or dilute ethanol. The [dl]-ψ-1-[5-iodo-2-furyl]-2-benzamidopropane-1,3-diol is the most insoluble of the two structural forms and is the first to separate from the crystallization mixture. This product has the formula,

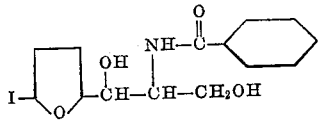

[dl]-ψ Form

[e] 25 g. of [dl]-ψ-1-[5-iodo-2-furyl]-2-benzamidopropane-1,3-diol is added to 150 cc. of 1 N hydrochloric acid and the mixture allowed to stand at room temperature for twenty-four hours. The reaction mixture is evaporated to dryness in vacuo to obtain the hydrochloride salt of [dl]-ψ-1-[5-iodo-2-furyl]-2-aminopropane-1,3-diol contaminated with benzoic acid. The mixture is added to an excess of 6 N ammonium hydroxide or sufficient aqueous sodium hydroxide solution to render the pH of the final solution about 8 and the precipitated free base collected. The product thus obtained is washed with water and dried. It is [dl]-ψ-1-[5-iodo-2-furyl]-2-aminopropane-1,3-diol of formula,

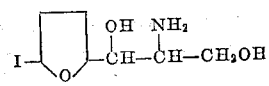

[dl]-ψ Form

[f] A mixture consisting of 5 g. of [dl]-ψ-1-[5-iodo-2-furyl]-2-aminopropane-1,3-diol and 5 g. of methyl dichloroacetate in 20 cc. of methanol is heated at 55° C. for one hour. The reaction mixture is evaporated to dryness in vacuo and the residue crystallized from dilute alcohol or ethylene dichloride to obtain the desired [dl]-ψ-1-[5-iodo-2-furyl]-2-dichloroacetamidopropane-1,3-diol of formula,

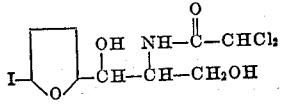

[dl]-ψ Form

[g] 2 g. of [dl]-ψ-1-[5-iodo-2-furyl]-2-aminopropane-1,3-diol is added to a mixture composed of 8 cc. of acetic anhydride and 8 cc. of dry pyridine and the resulting mixture heated at 100° C. for about one-half hour. The reaction mixture is evaporated to dryness in vacuo and the residue recrystallized from methanol to obtain the desired triacetate of [dl]-ψ-1-[5-iodo-2-furyl]-2-aminopropane-1,3-diol of formula,

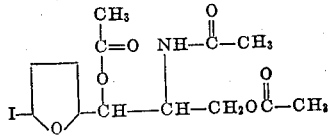

[dl]-ψ Form

[h] 1.8 g. of the triacetate of [dl]-ψ-1-[5-iodo-2-furyl]-2-aminopropane-1,3-diol is dissolved in a mixture consisting of 75 cc. of methanol, 75 cc. of water and 0.19 g. of sodium hydroxide at 0° C. and the mixture allowed to stand for one hour. The reaction mixture is exactly neutralized with hydrochloric acid and evaporated to dryness under reduced pressure. The residue is extracted with several portions of hot ethylene dichloride, filtered to remove the salt and the filtrate evaporated to dryness in vacuo. The residual [dl]-ψ-1-[5-iodo-2-furyl]-2-acetamidopropane-1,3-diol is taken up in dilute ethanol and purified by recrystallization from this solvent. The formula of this product is,

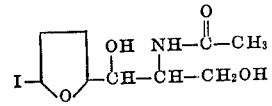

[dl]-ψ Form

The 2-furyl halomethyl ketone-hexamethylenetetramine complexes used as starting materials in the practice of the invention may be prepared by reacting a 2-furyl halomethyl ketone with hexamethylenetetramine in an inert organic solvent. Examples 1 [a] and 2 [a] above illustrate the preparation of some specific starting materials used in the practice of this invention.

What we claim is:

1. A compound of the formula,

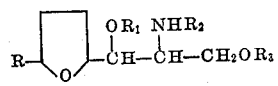

where R is a member of the class consisting of hydrogen, —NO₂, halogen and lower alkyl radicals, R₁ and R₃ are members of the class consisting of hydrogen and acyl radicals and R₂ is a member of the class consisting of hydrogen, H·HAcid and acyl radicals.

2. A compound of the formula,

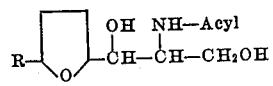

where R is a member of the class consisting of hydrogen, —NO₂, halogen and lower alkyl radicals.

3. A 1-[5-nitro-2-furyl]-2-dihaloacetamidopropane-1,3-diol.

4. [l]-ψ-1-[5-nitro-2-furyl]-2-dichloroacetamidopropane-1,3-diol.

5. A 1-[5-iodo-2-furyl]-2-dihaloacetamidopropane-1,3-diol.

6. [dl]-ψ-1-[5-iodo-2-furyl]-2-dichloroacetamidopropane-1,3-diol.

7. A 1-[2-furyl]-2-dihaloacetamidopropane-1,3-diol.

8. [l]-ψ-1-[2-furyl]-2-dichloroacetamidopropane-1,3-diol.

LOREN M. LONG.
NICKOLAS D. JENESEL.

No references cited.